Nov. 19, 1946.   A. RAPPL   2,411,292

GAUGE

Filed April 21, 1943   2 Sheets-Sheet 1

INVENTOR
ANTON RAPPL
BY
Bean, Brooks, Buckley & Bean.
ATTORNEYS

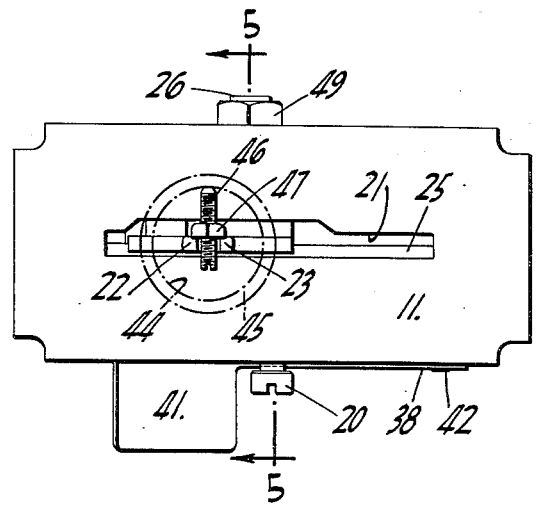
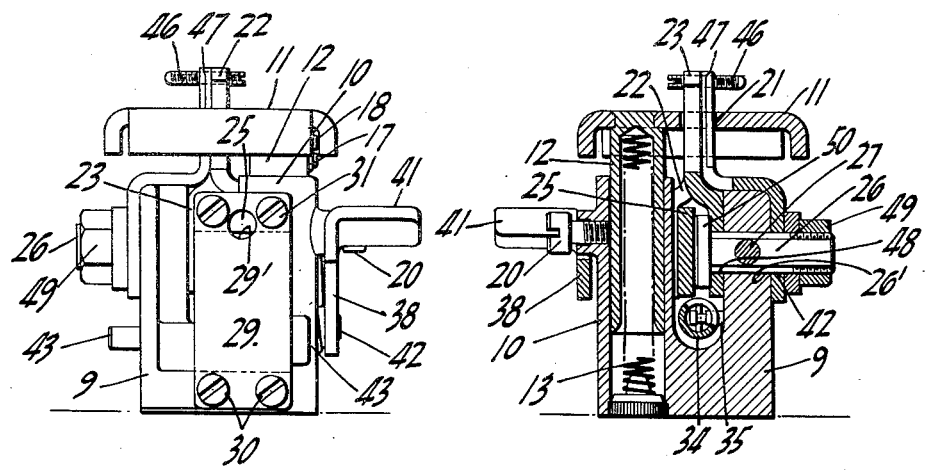

Patented Nov. 19, 1946

2,411,292

UNITED STATES PATENT OFFICE 2,411,292

GAUGE

Anton Rappl, Eggertsville, N. Y., assignor to Trico Products Corporation, Buffalo, N. Y.

Application April 21, 1943, Serial No. 483,878

7 Claims. (Cl. 33—178)

This invention relates to a gauge or instrument for determining the dimension of objects, and primarily functions in the capacity of a comparator for testing or comparing the bores or recesses in workpieces with their counterparts in a master piece.

Internal callipers usually comprise an adjustment which is slow and unsuitable for mass production methods of present day factory practice.

The object of the present invention is to provide an efficient comparator of this type which is practical and suitable for handling large quantities of workpieces in an expeditious though accurate manner.

The invention further has for its object to provide an internal gauging instrument of this character in which the work engaging calliper portions are disposed for the ready placement of the workpiece thereover, the instrumental construction and arrangement of parts being such as to reduce the number of operations to a minimum for measuring or testing a workpiece, thereby facilitating the handling of workpieces in quantity.

Referring more particularly to the drawings:

Fig. 3 is a top plan view of the work engaging part of the instrument.

Fig. 4 is an end view of such work engaging part; and,

Fig. 5 is a transverse vertical sectional view taken about on line 5—5 of Fig. 3.

Figure 2:
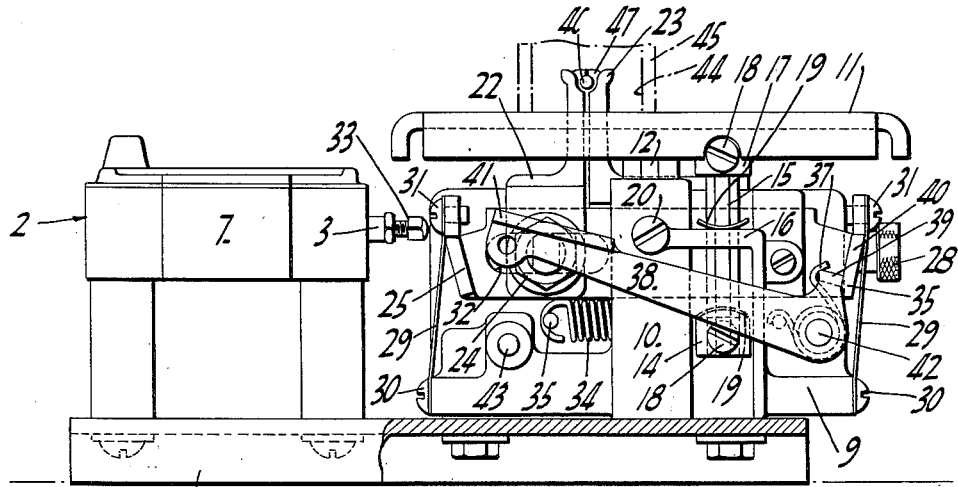
Fig. 2 is a side or front elevation of the instrument embodying the present invention.

Referring more particularly to the drawings, the numeral 1 designates the base of the instrument on which is mounted a micrometer mechanism 2 having an actuator in the form of a plunger 3 operable through a motion amplifying leverage generally indicated at 4 to impress the dimensional characteristic on a pointer 5 showing through a window 6 of the mechanism enclosing casing 7. Plus and minus tolerance indicators 8 may be associated with the pointer 5 in the window for the comparative testing of workpieces with respect to a master piece, such micrometer mechanism forming the subject matter of an earlier patent, No. 2,362,203.

The base 1 is provided with an upright standard 9 having a well 10. A work squaring table 11 has a depending shaft 12 guidingly fitting within the well and is yieldably supported by a spring 13 which, when free, moves the table to its uppermost position. To determine this position a stop 14 is provided on a table carried rod 15 which is slidable through an abutment 16. The depression of the table is limited by a stop 17 on the rod above the abutment. Both stops are adjustably secured by set screws 18 to vary the uppermost position, and the extent of free movement, of the table, and each stop is provided with a spring cushioning disk 19 free on the rod. The table may be fixed by a set screw 20 engaged with the shaft 12.

The table is provided with a slot 21 through which extend the upwardly directed calliper fingers 22 and 23. One finger 22 is removably secured by a nut 24 to a gauging carriage 25 while the companion finger 23 is adjustably fixed to a mounting slide 26. This slide is arranged within a slot 26' of the standard 9 for sliding adjustment effected by an adjusting screw 27, the latter being threaded through the slide 26 and journaled in the standard 9 for being turned by the knob 28. Upon rotating the knob the slide will be advanced or retracted and accordingly vary the adjustment of the fixed calliper finger 23 in the table slot 21. By tightening the set screw 27' against the adjusting screw 27 the position of the latter may be fixed.

The carriage 25 is supported at its opposite ends by a pair of parallel links which may be in the form of flat springs 29, the links having their lower ends fixed to the standard 9 by screws 30 and their upper ends secured to the carriage by screws 31. This mounting provides a support for the movable or floating calliper finger 22 practically free from friction and yet movable in a substantially horizontal plane. The forward one of the spring links 29 is formed with an aperture 29' to permit the plunger 3 passing therethrough into direct contact with the carriage. The movable calliper finger may be given limited adjustment on its floating support by means of a slot 32 in the carriage, the latter being urged against the plunger 3, or an adjustable extension 33 thereof, by a spring 34 which is anchored at one end on the standard carried pin 35 while its opposite end is engaged over a pin 36 on the carriage. This spring tends toward separating the calliper fingers, moving them to their work engaging position.

Normally, however, the calliper fingers are held in contracted relation for the ready placement of a workpiece thereover, and this normal relationship is effected by a coiled spring 37 acting on the short arm of a retractor lever 38 to counteract the action of the spring 34 on the carriage 25. The short arm has a lateral lug 39 normally engaging a shoulder 40 of the carriage, and upon depressing the finger pad 41 the retractor will pivot about its mounting pin 42 to release the carriage for movement by its spring 34 against the micrometer gauging plunger 3 which in turn transmits any imparted movement to the pointer 5.

Figure 1:
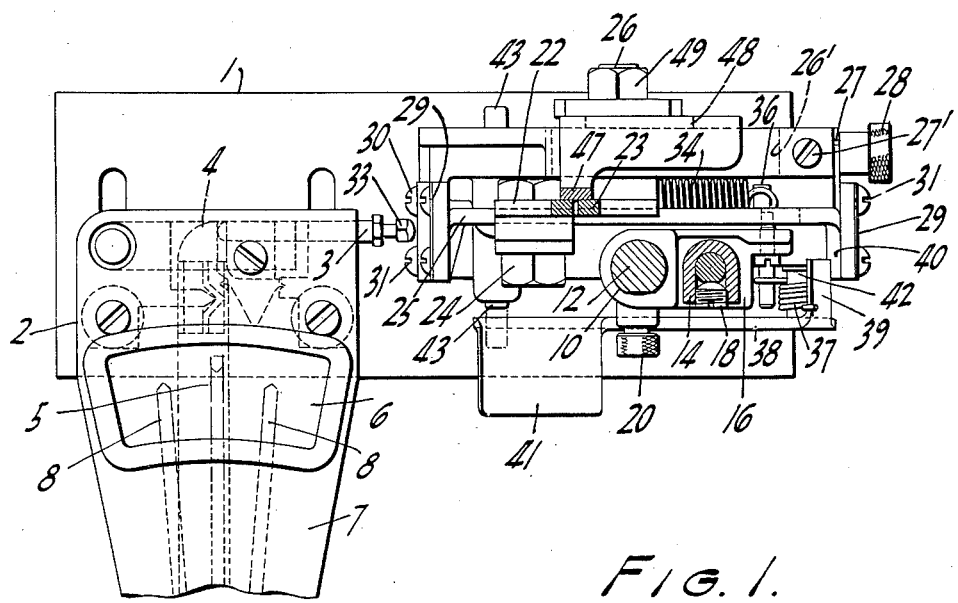
Fig. 1 is a plan view of the gauging or comparator instrument with portions thereof shown in horizontal section and other portions broken away.

For snap gauging use of the instrument, the retractor may be held inoperative or in its depressed position against the tension of its spring 37 by a latch pin 43 which is slidably mounted in the standard 9 for projection over the finger pad 41, as indicated by the broken lines in Fig. 1.

The calliper fingers have their active portions disposed in coplanar relation, as shown in Fig. 3, to engage diametrically opposing portions in a recess 44 of the workpiece 45 (Fig. 2) when released by the retractor. To center the workpiece for so engaging such opposed portions there is provided a centering pin 46 in the form of a screw which is adjustably carried on a supporting post 47. By means of this construction the centering pin is disposed radially in the recess and serves to dispose the calliper fingers in a diametral plane thereof normal to the centering pin. If a larger recess or bore is to be gauged the centering pin will be extended a greater distance from its post 47, and if a smaller recess is to be checked the pin will be withdrawn. The post 47 is mounted in normally fixed relation with the stationary calliper finger 23 although it may be adjusted to accommodate different sizes of recesses. For this purpose the post 47 is formed with a slot 48 through which the slide 26 extends. By means of a clamp nut 49 the post is clamped firmly against the side of the standard 9, the nut reacting through the slide to draw the head 50, on the inner end of the slide, clampingly against the base portion of the calliper finger 23. Consequently the tightening of the nut effects the securement of both the calliper finger and the post simultaneously.

In use, the calliper fingers are normally in contracted relationship for having the workpiece placed thereover and thereafter the retractor is depressed to release the floating carriage for action by its spring 34. The movable calliper finger 22 will thereupon move against the recess wall of the workpiece while the fixed calliper finger 23 is engaged at a diametrically opposed point, being supported laterally by the centering pin 46, as shown in Fig. 3. The extent of movement of the movable finger will be impressed on the plunger 3 and indicated by the pointer 5. If the pointer moves beyond or short of the two tolerance indicators 8, the workpiece will be rejected as being oversize or under size. If the pointer rests between the tolerance indicators, the workpiece is acceptable. By reason of the fact the fingers are normally contracted with respect to each other, the checking of quantities of workpieces may be accomplished in rapid succession since it is only necessary to manipulate the retractor once in the testing of each piece.

When the instrument is used for snap gauging, during which operation the retractor will be normally held depressed by the latch pin 43, the workpiece is arranged over the then normally separated calliper fingers and the indication by the pointer promptly noted without further manipulation.

The workpiece will be properly supported by the work positioning or squaring table 11. For checking a given part of the workpiece the table may be fixed by setting the screw 20, but where it is desired to check a long bore at plural points the workpiece may be pressed downwardly to depress the table for the desired extent while the table the meanwhile supports the workpiece in its normal position at all times. After counteracting pressure is relieved the spring 13 will restore the table to its normally elevated position as determined by the location of the lower stop 14. The parallel spring linkage 29 provides a practical support for holding the movable finger 22 in an upright position throughout its gauging range for greater accuracy, the carriage actually forming a part of this finger for impressing its movement on the actuator 3. Because the finger is normally spaced from the actuator the micrometer mechanism will be protected against imparted movement attending the placement and removal of the workpiece over the fingers, the actual movement of the plunger being relatively small as compared to the movement of the carriage allowed to facilitate the placement of the workpiece over the contracted fingers.

While the foregoing description has been given in detail, it is not intended thereby to restrict the invention since the inventive principles involved are capable of embodiment in other physical structures without departing from the spirit of the invention or the scope of the appended claims.

What is claimed is:

1. A gauge comprising an indicator, an actuator connected thereto by motion amplifying means, a pair of internal calliper fingers, one fixed and the other movable, a floating support carrying the movable finger, resilient means acting through the floating support to move the actuator as permitted by the engagement of the movable finger with a workpiece, an upright post interposed between the fingers and a transversely extending centering pin projecting from the post at a normal to the plane of movement of the movable finger and cooperating with both fingers to provide a three-point contact within a recess in the workpiece for centering the latter on the fingers.

2. A comparator gauge comprising a pair of internal calliper fingers for engaging diametrically opposed points on a wall of a recess in a workpiece, one fixed and the other movable, releasable means normally holding the fingers in contracted relation, a work centering pin, a post supporting the pin radially between the fingers and normal to the plane of the fingers to cooperate with the latter in providing a three-point contact with the workpiece, and means for adjusting the centering pin on the post and with respect to the fingers.

3. A gauge having a base, a pair of internal calliper fingers, a slide adjustable on the base and having parts extend from the opposite side thereof, one of the fingers being fixedly carried by one part of the slide, a floating support for the other finger, means for adjusting the slide to position its finger, a work centering post adjustably carried by the other part of the slide, and means acting concurrently to secure the centering post and the slide carried finger at their given adjustments.

4. A gauge comprising a base, a pair of internal calliper fingers, one of which fingers being fixed to the base, means supporting the other finger for movement against the wall of a recess in a workpiece, a work squaring table having a slot through which the fingers extend at a normal to the table surface, manually controlled means beneath the table operable to so move said other finger, means resiliently supporting the table for up and down movement under hand pressure to project the fingers more or less, and cushion means for limiting such up and down movement.

5. A gauge comprising a base, a pair of internal calliper fingers, one of which fingers being fixed to the base, means supporting the other finger for movement against the wall of a recess in a workpiece, a work positioning table having a slot through which the fingers extend at a normal to the table surface, means resiliently supporting the table for up and down movement to project the fingers more or less, manually controlled means beneath the table operable to so move said other finger, and means for holding the manually controlled means inoperative.

6. A gauge comprising a base, a pair of internal calliper fingers, one of which fingers being fixed to the base, means supporting the other finger for movement against the wall of a recess in a workpiece, a work squaring table having a slot through which the fingers extend at a normal to the table surface, means resiliently supporting the table to project the fingers more or less in the recess of the workpiece in accordance with the hand pressure on the latter, stop means adjustably regulating the extent of table depression, and means for cushioning the table arrest by said stop means.

7. A gauge comprising micrometer mechanism having an indicator and an actuator, a pair of calliper fingers, a support on which one finger is fixed, resilient means yieldably urging the other finger toward an operative relationship with respect to the actuator to impress the position of the movable finger on the indicator, spring means normally acting in counteraction of the resilient means to hold the movable finger out of operative relationship with the actuator whereby a workpiece may be placed against the calliper fingers without affecting the micrometer mechanism, a work table having a slot through which the fingers project upwardly, the slot extending in the direction of movement of the movable finger, means resiliently supporting the table for movement transverse to that of the movable finger, and means manually controlled for releasing said resilient means for functioning as aforesaid.

ANTON RAPPL.